2,790,813
Patented Apr. 30, 1957

2,790,813

SAFE RECOVERY OF TETRAHYDROFURAN VAPORS

Paul F. Bente, Jr., Lewiston, N. Y., assignor to E. I. du Pont de Nemours and Company, Wilmington, Del., a corporation of Delaware No Drawing. Application February 25, 1953, Serial No. 338,871

12 Claims. (Cl. 260—346.1)

This invention relates to the recovery of tetrahydrofuran vapors from air and more particularly to the recovery of the vapors without the formation of dangerous peroxides.

Because of its solvent powers tetrahydrofuran is beginning to find wide application in industry. Some processes such as the laying-down of protective films and the production of top coats and finishes require the evaporation of the solvent. Most other processes utilizing the material dissipate part of the solvent through evaporation. Unless the resultant vapors can be recovered, economic losses may become prohibitive. Use of tetrahydrofuran as a solvent is, however, somewhat complicated by its tendency to form unstable or even explosive peroxides by reaction with oxygen. Such peroxides may result from mere contact of the tetrahydrofuran with air, particularly if the former is in the vapor state.

Heretofore no safe procedure for the recovery of tetrahydrofuran vapors from air has, in fact, been available. Whenever the recovery was attempted peroxides were formed and these on occasion resulted in explosions. H. Rein, Angew. Chem. 62, 120 (1950), discusses the formation of these peroxides and describes an explosion resulting therefrom. A mechanism yielding the peroxides is shown by Criegee in the same journal. It is evident that recovery of tetrahydrofuran vapors from air is attended by some risk. An additional problem derives from the fact that tetrahydrofuran and water form an azeotropic mixture that cannot easily be broken. The mixture, which contains about 5.3% water, possesses a boiling point of 63.4°–63.8° C. Since the boiling point of tetrahydrofuran is 65°–67° C. at standard pressure, the azeotrope is the first fraction collected on distillation of tetrahydrofuran vapors condensed from moist air.

An object of this invention is therefore development of a novel and useful process for recovering tetrahydrofuran vapors from air. Another object is development of a process for recovering tetrahydrofuran from air without the formation of dangerous peroxides. A further object is development of a process which can recover tetrahydrofuran from air and dry the recovered material. Still further objects will be evident from the remainder of this specification.

The above-mentioned objectives can be accomplished by a procedure which includes adsorbing tetrahydrofuran vapors mixed with air on activated charcoal containing iron, steaming the charcoal to recover tetrahydrofuran, and drying the tetrahydrofuran with n-pentane. A preliminary distillation of the steam condensate to obtain the azeotrope, found in the first fraction distilled, may be employed to reduce the amount of n-pentane required.

Several other variations in procedure may be followed. Other finely divided colloidal adsorbing agents such as diatomaceous earth and silica gel may, for example, be substituted for charcoal but charcoal is preferred.

It is essential that whatever adsorption agent is utilized contain a material like iron which inhibits the formation of peroxides or can destroy the peroxides if they are formed. Such materials include those metals most closely resembling iron, that is cobalt and nickel. Iron is very satisfactory and is preferred because it is present in some commercial charcoals. The iron, cobalt or nickel utilized will generally be in some combined form such as an oxide but the exact state of chemical combination is not considered critical. The quantity of metal present in the charcoal may vary from a minimum of about 15 p. p. m. to appreciable fractions of the adsorbant. Preferably charcoal containing about 75 p. p. m. iron is employed.

It is not absolutely essential that n-pentane be employed in the drying step since, as will be evident, other materials may be substituted for it. Since n-pentane is relatively cheap and quite efficient, it is preferred.

There follow several examples which illustrate in more detail the various aspects of this invention.

EXAMPLE 1

Liquid tetrahydrofuran (THF) was percolated through various granular carbon beds formed from commercial activated charcoals in the presence of air to determine the effect of the charcoal on peroxides. Some of the carbon contained iron while one sample did not. Results are set forth in Table I.

Table I.—*Percolation of tetrahydrofuran through charcoal*

| Carbon Sample | A | B | C |
|---|---|---|---|
| Iron in sample (p. p. m.) | 10–60 | 1,000–10,000 | 0 |
| THF Peroxide (mg.): | | | |
| (1) In Original THF | 86 | 140 | 86 |
| (2) In Effluent THF | 16 | 25 | 37 |
| (3) Left in Carbon | 16 | 3 | 50 |
| (4) Decomposed | 54 | 112 | 0 |

Charcoals containing a very small quantity of iron will not only remove peroxides but will actually destroy them. Charcoals containing no iron may remove some of the peroxides but will not decompose them. Tetrahydrofuran can therefore safely be rendered almost peroxide free by contact with charcoal containing iron.

EXAMPLE 2

A series of runs was made by passing air containing tetrahydrofuran vapors through an adsorption column holding one pound of the charcoal called sample A above. Space velocity was varied between 0.8–6.8 l./l./min. and contact time of the air stream with the charcoal varied between 9 and 97 seconds. The concentration of tetrahydrofuran vapors used in the entire series ranged between 0.01–1.9% by volume.

The column was scrubbed with steam after each passage of the vapors therethrough and the steam-tetrahydrofuran mixture condensed. In some cases the condensate was then dried by distillation with n-pentane as noted below. Results showing adsorption without the formation of peroxides are given by Table II.

Table II.—*Adsorption of tetrahydrofuran on charcoal vapors*

| Run | 1 | 2 | 3 | 4 | 5 |
|---|---|---|---|---|---|
| THF vapor in air (percent by vol.) | 0.8 | 0.8 | 1.9 | 0.75 | 1.1 |
| Relative humidity of air (room temp.) | 0 | 0 | 100 | 40 | 40 |
| Space velocity (l./l./min.) | 2.8 | 0.6 | 1.1 | 8.0 | 4.1 |
| Linear velocity of gas (cm./sec.) | 2.7 | 0.6 | 1.1 | 6.8 | 4.0 |
| Contact time vapors with carbon (sec.) | 22 | 97 | 53 | 9 | 15 |
| Total weight of THF (g.) | 84 | 164 | 89 | 133 | 103 |
| THF-water azeotrope recovered (g.) | 72 | 135 | 84 | | |
| THF Peroxide (p. p. m.): | | | | | |
| (1) In carbon before steaming | | | 50 | | 30 |
| (2) In carbon after steaming | | 44 | 6 | | 41 |
| (3) In THF-steam condensate | | | 0 | | 6 |
| (4) In THF-water azeotrope | | 0 | | | 0 |

Table II shows that tetrahydrofuran vapors mixed with air can be recovered over charcoal containing iron without the formation of any peroxide. Concentration and drying of the steam distillate can then be carried out without danger. In this process it will be noted that such factors as the initial concentration of the tetrahydrofuran vapors in air, the space or linear velocity of the gas mixture, contact time and relative humidity are not critically important. The concentration of the vapors is however limited in practice by the fact that mixtures of air and tetrahydrofuran containing above about 2.1% of the organic material are explosive.

EXAMPLE 3

The steam condensates of Example 2 always give the tetrahydrofuran-water azeotrope on simple fractionation. If the azeotrope is distilled in the presence of n-pentane weighing 25–100% as much as the azeotrope, fractionation occurs and substantially anhydrous tetrahydrofuran separates. In practice the azeotrope may be first mixed with an equal volume of n-pentane. The mixture separates into a bottom water layer and a top organic layer. The water is drawn off and the top layer can then easily be fractionated, any water remaining after the mechanical separation passing off with the pentane. The effect of n-pentane on the azeotrope is shown by Table III.

*Table III.—Drying tetrahydrofuran with n-pentane*

| Run | Azeotrope (cc.) | n-Pentane (cc.) | Water Layer (cc.) | Percent THF recovered dry [1] | Percent $H_2O$ in dried THF |
|---|---|---|---|---|---|
| 1 | 200 | 100 | 5 | -------- | 0.3 |
| 2 | 210 | 210 | 10 | [2] 71 | 0.2 |
| 3 | 200 | From Runs 1 and 2 | 16 | 100 | 0.5 |
| 4 | 165 | From Run 3 | 6 | 100 | 0.2 |

[1] After n-pentane was distilled off.
[2] Remainder was left in reused n-pentane fraction.

It will be seen that the volume of n-pentane utilized can be as small as one-half that of the tetrahydrofuran water mixture. Larger amounts are of course efficacious but increase the costs of the distillation. Some other compounds such as ethanol, n-hexane, benzene, and cyclohexane may be substituted for n-pentane but none of these can be separated as easily from tetrahydrofuran as can the n-pentane. In addition, formation of peroxides was greatly increased in the fractionation step by cyclohexane, necessitating the use of an inhibitor. The glycerol of Bremner et al., British Patent 630,149 can also be substituted for n-pentane but, like the other substituents, is not as efficient as the pentane.

It is clear from the foregoing examples that adsorption of tetrahydrofuran vapors on charcoal containing only traces of iron compounds, steaming the charcoal after the adsorption, fractionating the condensate, adding n-pentane to the azeotrope and fractionating the resulting pentane-tetrahydrofuran mixture is an efficient method of recovering tetrahydrofuran for reuse as a solvent. N-pentane can alternatively be added directly to the first steam condensate but, for reasons of economy, it may be preferred to fractionate the latter and add the pentane to the azeotrope alone.

The value of iron-containing charcoal with tetrahydrofuran is not limited to its use in the recovery process. Tetrahydrofuran can be stored over charcoal carrying traces of iron without formation of dangerous quantities of the peroxide. Thus tetrahydrofuran can be kept in a closed glass container with little or no air space for long periods of time if 5–25% by weight of the iron-containing charcoal is supplied thereto. Such a method of storage avoids use of soluble additives. Tetrahydrofuran can be separated from the charcoal by distillation or by mere filtration. Table IV shows the effect of adding charcoal containing iron to samples of tetrahydrofuran stored under identical conditions in a closed container with an air space at the top.

*Table IV.—Storage of tetrahydrofuran*

| Volume of THF (cc.) | Sample A Carbon (g.) | THF Peroxide (p. p. m.) | | | |
|---|---|---|---|---|---|
| | | 0 Days | 5 Days | 10 Days | 60 Days |
| 60 | 0 | 0 | 2,470 | 6,750 | 17,600 |
| 60 | 10 | 0 | 30 | 90 | 440 |
| 50 | 0 | 0 | 7,040 | -------- | -------- |
| 50 | 5 | 0 | 70 | -------- | -------- |

Having now described my invention, I claim:

1. The method of inhibiting the formation of peroxides in tetrahydrofuran which comprises contacting said tetrahydrofuran with a finely divided inert carrier containing 10 to 10,000 p. p. m. of a metal chosen from the group consisting of iron, cobalt and nickel.

2. The method of inhibiting the formation of peroxides in tetrahydrofuran which comprises contacting the tetrahydrofuran with an adsorption agent for tetrahydrofuran containing 10 to 10,000 p. p. m. of iron.

3. The method of claim 2 in which the adsorption agent is activated charcoal and iron is present therein to the extent of about 15 to 75 p. p. m.

4. The method of claim 3 in which iron is present in the activated charcoal to the extent of about 75 p. p. m.

5. The process of recovering tetrahydrofuran from a mixture of the vapor thereof with air which comprises passing said mixture through an adsorption agent containing 10 to 10,000 p. p. m. of iron to decompose catalytically peroxides of tetrahydrofuran, passing steam through said adsorption agent following the mixture, condensing the steam after its passage through the adsorption agent and separating tetrahydrofuran from the resultant steam condensate.

6. The process of claim 5 in which the adsorption agent is activated charcoal.

7. The process of recovering tetrahydrofuran from a mixture of the vapor thereof with air which comprises passing said mixture through activated charcoal containing between about 15 p. p. m. to about 75 p. p. m. of iron, passing steam through the charcoal following the mixture with air, condensing the steam after its passage through the charcoal and separating tetrahydrofuran from the resulting steam condensate.

8. The process of recovering tetrahydrofuran from a mixture of the vapor thereof with air which comprises passing said mixture through activated charcoal containing between about 15 p. p. m. to about 75 p. p. m. of iron, passing steam through the charcoal, condensing the steam after its passage through the charcoal, adding n-pentane to the resulting steam condensate, separating the organic and aqueous layers which form in said condensate upon the addition of n-pentane and fractionating the organic layer.

9. The process of claim 8 in which the n-pentane added to the condensate weighs between about 25% and 100% as much as the azeotrope.

10. The process of recovering tetrahydrofuran from a mixture of the vapor thereof with air which comprises passing said mixture through activated charcoal containing between about 15 p. p. m. and about 75 p. p. m. of iron, passing steam through said charcoal, condensing the steam after its passage through the charcoal, distilling the tetrahydrofuran-water azeotrope from the resulting steam condensate, adding n-pentane to said condensate and separating the organic and aqueous layers which form in the condensate after the addition of the n-pentane.

11. The process of claim 10 in which the activated charcoal contains about 75 p. p. m. of iron.

12. The process which comprises passing tetrahydrofuran vapor through activated charcoal containing not less than 15 p. p. m. iron to catalytically decompose tetrahydrofuran peroxides and subsequently recovering tetrahydrofuran from said absorption agent.

References Cited in the file of this patent

UNITED STATES PATENTS

| | | |
|---|---|---|
| 1,080,263 | Coleman | Dec. 2, 1917 |
| 2,251,292 | Reppe | Aug. 5, 1941 |
| 2,251,835 | Reppe | Aug. 5, 1941 |
| 2,431,675 | Bour | Dec. 2, 1947 |

FOREIGN PATENTS

| | | |
|---|---|---|
| 740,187 | Germany | Oct. 20, 1943 |
| 895,577 | France | Jan. 29, 1945 |